US012801047B2

(12) United States Patent
Isobe

(10) Patent No.: US 12,801,047 B2
(45) Date of Patent: Nov. 17, 2026

(54) TONER FOR ELECTROSTATIC CHARGE IMAGE DEVELOPMENT AND METHOD FOR MANUFACTURING TONER FOR ELECTROSTATIC CHARGE IMAGE DEVELOPMENT

(71) Applicant: Konica Minolta, Inc., Tokyo (JP)

(72) Inventor: Kazuya Isobe, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 515 days.

(21) Appl. No.: 18/493,077

(22) Filed: Oct. 24, 2023

(65) Prior Publication Data

US 2024/0219855 A1 Jul. 4, 2024

(30) Foreign Application Priority Data

Dec. 2, 2022 (JP) ................................. 2022-193219

(51) Int. Cl.
*G03G 9/087* (2006.01)
*G03G 9/08* (2006.01)

(52) U.S. Cl.
CPC ....... *G03G 9/08755* (2013.01); *G03G 9/0806* (2013.01)

(58) Field of Classification Search
CPC ... G03G 9/087; G03G 9/0806; G03G 9/08755
See application file for complete search history.

(56) References Cited

U.S. PATENT DOCUMENTS

| | | | | |
|---|---|---|---|---|
| 6,177,525 B1 * | 1/2001 | McKee | C08F 291/00 526/201 |
| 2022/0187725 A1 * | 6/2022 | Yamamoto | G03G 9/08724 |

FOREIGN PATENT DOCUMENTS

| | | | |
|---|---|---|---|
| JP | H08-050368 | A | 2/1996 |
| JP | 2007-279714 | A | 10/2007 |
| JP | 2008-287229 | A | 11/2008 |
| JP | 2010-015159 | A | 1/2010 |

* cited by examiner

*Primary Examiner* — Peter L Vajda
*Assistant Examiner* — Grant Steven Seiler
(74) *Attorney, Agent, or Firm* — LUCAS & MERCANTI, LLP

(57) ABSTRACT

A toner for electrostatic charge image development includes toner particles. The toner particles contain a polymer having a structural unit represented by the general expression (1):

General expression (1)

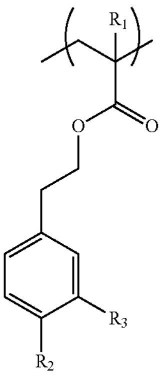

and a release agent. In the general expression (1), $R_1$ represents a hydrogen atom or an alkyl group having 1 to 3 carbon atoms. $R_2$ and $R_3$ each independently represents a hydrogen atom, an alkyl group having 1 to 3 carbon atoms, or an alkoxy group.

17 Claims, 1 Drawing Sheet

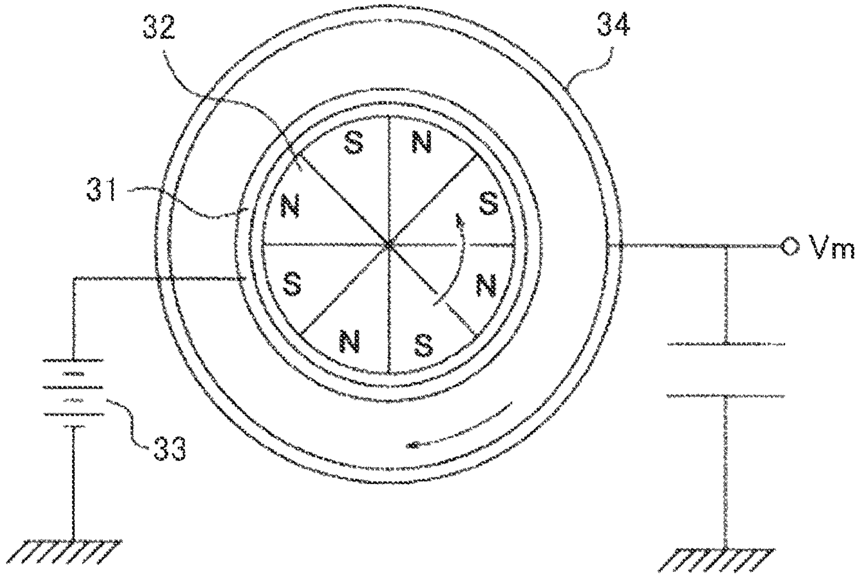
32
34
31
S
N
N
S
S
N
N
S
Vm
33

TONER FOR ELECTROSTATIC CHARGE IMAGE DEVELOPMENT AND METHOD FOR MANUFACTURING TONER FOR ELECTROSTATIC CHARGE IMAGE DEVELOPMENT

CROSS-REFERENCE TO RELATED APPLICATIONS

The entire disclosure of Japanese Patent Application No. 2022-193219 filed on Dec. 2, 2022 is incorporated herein by reference in its entirety.

BACKGROUND

Technical Field

The present invention relates to a toner for electrostatic charge image development and a method for manufacturing the toner for electrostatic charge image development. In particular, the present invention relates to a toner for electrostatic charge image development and the like which satisfy low-temperature fixability and are excellent in charging properties capable of achieving high print output speed.

Description of the Related Art

With the decrease in print volume, the need for digital printing capable of small lot printing has been increasing in recent years. In general, in order to increase profitability in the printing business, it is important to increase productivity per unit time. In digital printing, similarly, an increase in print output speed can be an indispensable major problem.

Conventionally, in order to solve such a problem of increase in speed, studies have been made on low-temperature fixing of a toner that can be fixed on a medium such as paper with a low energy amount (for example, see JP 2007-279714A, JP 2008-287229A, and JP 2010-15159A).

Specifically, lowering the glass transition temperature of the toner binder, which is a main toner component, and lowering the melt viscosity by controlling the molecular weight distribution can be exemplified.

Lowering the glass transition temperature of the toner binder can be adjusted, for example, as follows. In the styrene-acrylic resin, the ratio of a hard segment such as styrene, which is a monomer, to a soft segment such as n-butyl acrylate, which is a monomer, can be adjusted. Here, a hard segment such as styrene is a high glass transition temperature component and a soft segment such as n-butyl acrylate is a low glass transition temperature component. By increasing the ratio of the soft segment such as butyl acrylate, lowering the glass transition temperature can be realized.

However, increasing the ratio of the soft segment increases the adhesion between the toner and the roller in the commonly used thermal roller fixing. Therefore, the image and the roller cannot be successfully separated at the time of fixing. As a consequence, there is a problem in that an image is caught in a roller and a printed matter cannot be obtained, or a problem in that an image surface is roughened to form an uneven image, that is, separability after fixing is deteriorated.

To address the problems, a release agent such as a fatty acid ester wax having a low melt viscosity has been added for the purpose of suppressing adhesion between the fixing member and the toner (for example, see JP H08-50368A). Such a release agent such as a fatty acid ester wax bleeds out at the interface between the fixing member and the fixed image at the time of fixing, and the adhesion can be suppressed.

However, even when a release agent having a low melt viscosity is added, it is often difficult to ensure sufficient releasability when the ratio of the soft segment is high.

Further, increasing the ratio of the soft segment can realize the low-temperature fixing described above, but has the following problems in addition to causing problems in separability after fixing. That is, when a common n-butyl acrylate is used as a monomer, the dielectric loss tangent (tan $\delta$), which is an index of the charge leakage property, is higher in the charging property required for a toner. Therefore, there is a problem that the charge retention property is low.

In addition, since the low charge retention property leads to a reduction in the charge amount of the toner, in particular, in increasing the print output speed, the toner cannot obtain a sufficient charge amount. Therefore, as a result, problems such as contamination inside a machine due to toner scattering and occurrence of image defects have become apparent.

SUMMARY

The present invention has been made in view of the above problems and situations. An object of the present invention is to provide a toner for electrostatic charge image development having excellent charging properties while satisfying low-temperature fixability and separability after fixing, and a method for manufacturing the same.

In order to solve the above problems, the present inventors have found the importance of containing a polymer having a specific structural unit as a binder resin and containing a release agent. Accordingly, it is possible to provide a toner for electrostatic charge image development or the like which satisfy low-temperature fixability and separability after fixing and have excellent charging properties capable of suppressing contamination inside a machine such as toner scattering.

That is, the above problems according to the present invention are solved by the following means.

To achieve at least one of the abovementioned objects, according to an aspect of the present invention, the toner for electrostatic charge image development, reflecting one aspect of the present invention is:

A toner for electrostatic charge image development comprising toner particles, wherein the toner particles contain a polymer having a structural unit represented by the general expression (1) and a release agent.

General expression (1)

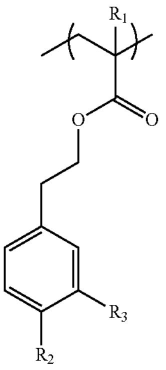

[In the general expression (1), $R_1$ represents a hydrogen atom or an alkyl group having 1 to 3 carbon atoms. $R_2$ and $R_3$ each independently represents a hydrogen atom, an alkyl group having 1 to 3 carbon atoms, or an alkoxy group.]

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIGURE is a diagram showing a device for measuring the charge amount used in Examples.

DETAILED DESCRIPTION

Hereinafter, one or more embodiments of the present invention will be described with reference to the drawings. However, the scope of the invention is not limited to the disclosed embodiments.

A toner for electrostatic charge image development of the present invention is a toner for electrostatic charge image development containing toner particles, wherein the toner particles contain a polymer having a structural unit represented by the general expression (1) and a release agent.

This feature is a technical feature common to or corresponding to the respective embodiment described below.

In an embodiment of the present invention, it is preferable that the release agent is a fatty acid ester using a fatty acid having a range of 16 to 24 carbon atoms from the viewpoint of interaction with the polymer according to the present invention.

It is preferable that $R_1$ in the general expression (1) is a hydrogen atom or a methyl group, and $R_2$ and $R_3$ are each independently a hydrogen atom or a methoxy group from the viewpoint of achieving both low-temperature fixability and separability after fixing.

It is preferable that $R_2$ and $R_3$ in the general expression (1) are hydrogen atoms from the viewpoints of low-temperature fixability, separability after fixing, and chargeability.

It is preferable that the polymer having a structural unit represented by the general expression (1) is a copolymer of a first polymerizable monomer having a structure represented by the following general expression (2) and a second polymerizable monomer copolymerizable with the first polymerizable monomer.

General expression (2)

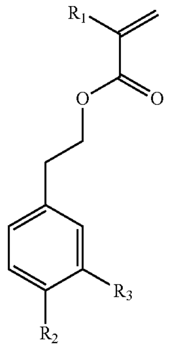

[In the general expression (2), $R_1$ represents a hydrogen atom or an alkyl group having 1 to 3 carbon atoms. $R_2$ and $R_3$ each independently represents a hydrogen atom, an alkyl group having 1 to 3 carbon atoms, or an alkoxy group.]

The content of the structural unit derived from the first polymerizable monomer is preferably in the range of 10 to 35% by mass with respect to the total structural unit (100% by mass) constituting the polymer having the structural unit represented by the general expression (1). As a result, a sufficient charge amount can be obtained while achieving both low-temperature fixability and separability after fixing.

The second polymerizable monomer is preferably selected from the group consisting of at least styrenes, acrylic acid, methacrylic acid, acrylic acid ester, and methacrylic acid ester. In particular, the second polymerizable monomer is preferably one or more kinds selected from the group consisting of at least one of styrene, acrylic acid, n-butyl acrylate, iso-butyl acrylate, 2-ethylhexyl acrylate, and methacrylic acid. This is preferable in that the glass transition temperature of the polymer according to the present invention can be easily adjusted.

It is preferable that the fatty acid ester using a fatty acid having a range of 16 to 24 carbon atoms is a behenyl behenate from the viewpoint of low-temperature fixability and separability after fixing.

It is preferable that the fatty acid ester using a fatty acid having a range of 16 to 24 carbon atoms is a pentaerythritol tetrabehenate from the viewpoint of low-temperature fixability and separability after fixing.

It is preferable that the fatty acid ester using a fatty acid having a range of 16 to 24 carbon atoms is an ethylene glycol distearate from the viewpoint of low-temperature fixability and separability after fixing.

The content of the fatty acid ester using the fatty acid having a range of 16 to 24 carbon atoms in a toner for electrostatic charge image development is preferably in the range of 5 to 20% by mass. When the content is within the above range, both low-temperature fixability and separability after fixing can be achieved.

A method for manufacturing a toner for electrostatic charge image development according to an embodiment of the present invention includes a step of polymerizing a first polymerizable monomer having a structure represented by the following general expression (2) to prepare a toner binder particle dispersion liquid containing the release agent. Thus, it is possible to manufacture a toner in which a sufficient charge amount can be obtained while achieving both low-temperature fixability and separability after fixing.

General expression (2)

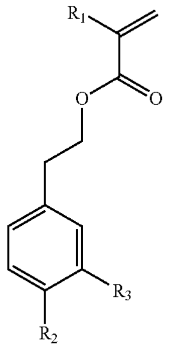

[In the general expression (2), $R_1$ represents a hydrogen atom or an alkyl group having 1 to 3 carbon atoms. $R_2$ and $R_3$ each independently represents a hydrogen atom, an alkyl group having 1 to 3 carbon atoms, or an alkoxy group.]

The method for manufacturing a toner for electrostatic charge image development of another embodiment of the present invention includes a step of polymerizing a first polymerizable monomer having a structure represented by the general expression (2) to prepare a toner binder particle dispersion liquid containing a fatty acid ester using a fatty acid having a range of 16 to 24 carbon atoms as a release agent. Thus, it is possible to manufacture a toner in which a sufficient charge amount can be obtained while achieving both low-temperature fixability and separability after fixing.

Hereinafter, the present invention, its constituent elements, and embodiments and aspects for carrying out the present invention will be described. In the present application, "to" is used in the meaning that numerical values described before and after are included as a lower limit value and an upper limit value.

Toner for Electrostatic Charge Image Development of Present Invention

A toner for electrostatic charge image development of the present invention (hereinafter, also simply referred to as a "toner") is a toner for electrostatic charge image development containing toner particles, wherein the toner particles contain a polymer having a structural unit represented by the following general expression (1) and a release agent.

In the present specification, the "toner base particles" constitute the base of the "toner particles". The "toner base particles" include at least a toner binder and a release agent, and may contain other components such as a colorant and a charge control agent, if necessary. The "toner base particles" are referred to as "toner particles" by the addition of an external additive. The "toner" means an aggregate of "toner particles".

Polymer Having Structural Unit Represented by General Expression (1)

The toner according to the present invention contains a polymer having a structural unit represented by the following general expression (1) (the polymer according to the present invention). The polymer according to the present invention is preferably contained as a toner binder.

General expression (1)

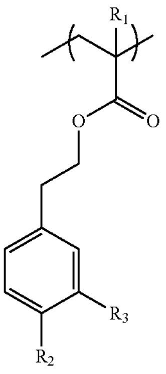

$R_1$ in the general expression (1) represents a hydrogen atom or an alkyl group having 1 to 3 carbon atoms.

$R_2$ and $R_3$ each independently represents a hydrogen atom, an alkyl group having 1 to 3 carbon atoms, or an alkoxy group.

Specific examples of $R_1$ include a hydrogen atom, a methyl group, an ethyl group, a n-propyl group, and an iso-propyl group. Specific examples of $R_2$ and $R_3$ include a hydrogen atom, a methyl group, an ethyl group, a n-propyl group, an iso-propyl group, a methoxy group, an ethoxy group, a n-propoxy group or an iso-propoxy group.

$R_1$ is preferably a hydrogen atom or a methyl group from the viewpoint of obtaining a sufficient charge amount while achieving both low-temperature fixability and separability after fixing. $R_2$ and $R_3$ are preferably a hydrogen atom, a methyl group or a methoxy group.

The polymer according to the present invention can be synthesized by polymerizing a monomer having a structure represented by the following general expression (2) (hereinafter also referred to as a "first polymerizable monomer").

General expression (2)

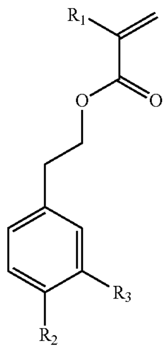

In the general expression (2), $R_1$ represents a hydrogen atom or an alkyl group having 1 to 3 carbon atoms.

$R_2$ and $R_3$ each independently represents a hydrogen atom, an alkyl group having 1 to 3 carbon atoms, or an alkoxy-group.

$R_1$, $R_2$ and $R_3$ have the same meanings as $R_1$, $R_2$ and $R_3$ in the general expression (1), respectively.

The first polymerizable monomer may be used alone or in combination of two or more.

Specific examples of the first polymerizable monomer include the following exemplified compounds M1 to M12, but the present invention is not limited thereto.

M1

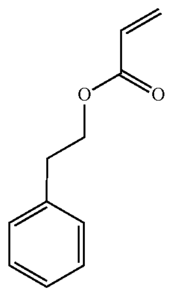

-continued
M2
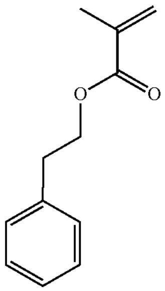
M3
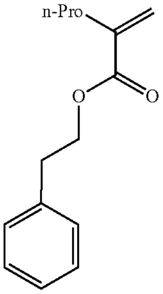
M4
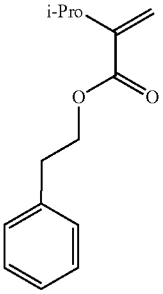
M5
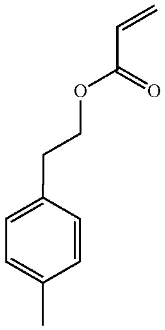
M6
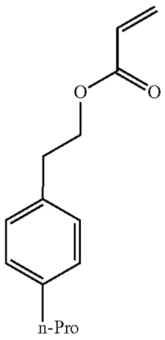
-continued
M7
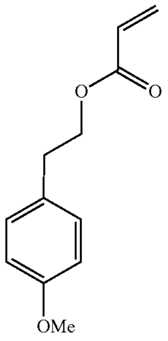
M8
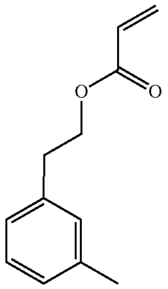
M9
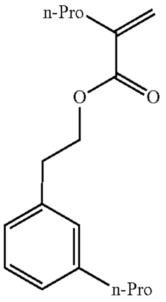
M10
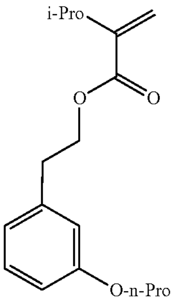
M11
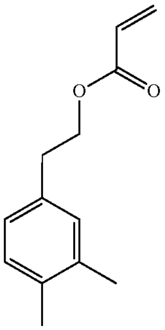

-continued

M12

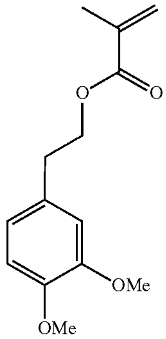

As the first polymerizable monomer, a commercially available product or a synthetic product may be used.

In one example of the synthesis method of the first polymerizable monomer, the first polymerizable monomer may be obtained by condensation of (meth)acrylic acid as the starting raw material and predetermined alcohols.

The content of the structural unit derived from the first polymerizable monomer is preferably in the range of 5 to 50% by mass with respect to the total structural unit (100% by mass) constituting the polymer according to the present invention. More preferably, the content is in the range of 10 to 35% by mass.

The polymerization method of the first polymerizable monomer is not particularly limited. However, from the viewpoint of easy synthesis, a method of radically polymerizing a monomer using a known oil-soluble or water-soluble radical polymerization initiator is preferable.

That is, a method for manufacturing a toner according to a preferred embodiment of the present invention is a method for manufacturing a toner for electrostatic charge image development including a toner binder containing a polymer according to the present invention and a release agent. The method includes a step of (radical) polymerizing a polymerizable monomer having the structure represented by the general expression (2) to synthesize the polymer according to the present invention, and a step of mixing the toner binder and the release agent.

Specific examples of the oil-soluble polymerization initiator used for the radical polymerization include the following azo-based or diazo-based polymerization initiators and peroxide-based polymerization initiators. For example, known chain transfer agents such as n-octyl mercaptan and n-octyl-3-mercaptopropionate may be used as necessary.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butyl peroxycyclohexyl) propane, and tris-(t-butylperoxy) triazine.

When the polymer according to the present invention is formed by an emulsion polymerization method, a water-soluble radical polymerization initiator can be used.

Examples of the water-soluble radical polymerization initiator include persulfates such as potassium persulfate and ammonium persulfate, azobisaminodipropane acetate, azobiscyanovaleric acid and salts thereof, and hydrogen peroxide.

The polymerization temperature varies depending on the type of the monomer and the polymerization initiator used, but is preferably in the range of 50 to 100 °C, and more preferably in the range of 55 to 90 °C, although it.

The polymerization time varies depending on the type of the monomer and the polymerization initiator used, but is preferably 1 to 12 hours, for example.

Polymer Having Other One or More Structural Units

The polymer according to the present invention may be a polymer obtained only from the polymerizable monomer (first polymerizable monomer) having a structure represented by the general expression (2).

However, from the viewpoint of more efficiently exhibiting the effects of the present invention, it is preferable to use a copolymer of a first polymerizable monomer and other one or more polymerizable monomers (also referred to as "second polymerizable monomer") copolymerizable with the first polymerizable monomer as described below.

Examples of the second polymerizable monomer include styrene-based monomers such as stylene. α-methylstyrene, o-methylstyrene, m-methylstyrene, p-methylstyrene, o-ethylstyrene, m-ethylstyrene, p-ethylstyrene, o-acetoxystyrene, m-acetoxystyrene, and p-acetoxystyrene; acrylic acid esters such as methyl acrylate, ethyl acrylate, isopropyl acrylate, n-butyl acrylate, tert-butyl acrylate, isobutyl acrylate (iso-butyl acrylate), n-octyl acrylate, 2-ethylhexyl acrylate, stearyl acrylate, lauryl acrylate, and phenyl acrylate; methacrylic acid esters such as methyl methacrylate, ethyl methacrylate, n-butyl methacrylate, isopropyl methacrylate, isobutyl methacrylate (iso-butyl methacrylate), tert-butyl methacrylate, n-octyl methacrylate, 2-ethylhexyl methacrylate, stearyl methacrylate, lauryl methacrylate, phenyl methacrylate, dimethylaminoethyl methacrylate, and diethylaminoethyl methacrylate; acrylic acid, and methacrylic acid.

Among these, at least one selected from styrenes, acrylic acid esters, and methacrylic acid esters is preferable.

Further, it is preferable that at least one is selected from styrene, acrylic acid, n-butyl acrylate, iso-butyl acrylate, 2-ethylhexyl acrylate, and methacrylic acid. Furthermore, at least one of styrene and n-butyl acrylate is preferred. By using such a monomer, the glass transition temperature of the polymer can be easily adjusted.

Further, as the second polymerizable monomer, a polymerizable monomer having an ionic dissociation group may be used.

The polymerizable monomer having an ionic dissociation group is, for example, one having a group such as a carboxy group, a sulfonic acid group, or a phosphoric acid group. Specific examples thereof include acrylic acid, methacrylic acid, maleic acid, itaconic acid, and fumaric acid. Of these, acrylic acid or methacrylic acid is preferred.

These second polymerizable monomers may be used alone or in combination of two or more.

In the polymer according to the present invention, the content of the structural unit derived from the second polymerizable monomer is not particularly limited, and can be appropriately adjusted according to the type of the structural unit.

For example, when the second polymerizable monomer is the styrene-based monomer described above, the content of the structural unit derived from the styrene-based monomer in the polymer is preferably in the range of 20 to 80% by mass. More preferably, it is in the range of 30 to 70% by mass. Here, in the content, the total structural unit constituting the polymer according to the present invention is set to 100% by mass.

When the second polymerizable monomer is an acrylic acid ester or a methacrylic acid ester, the content of the structural unit derived from the acrylic acid ester or the methacrylic acid ester in the polymer is preferably in the range of 5 to 50% by mass. More preferably, it is in the range of 10 to 40% by mass. Here, in the content, the total structural unit constituting the polymer according to the present invention is set to 100% by mass.

When a polymerizable monomer having an ionic dissociation group is used, the content of the structural unit is preferably in the range of 3 to 8% by mass. Here, in the content, the total structural unit constituting the polymer according to the present invention is set to 100% by mass.

The synthesis method of the polymer according to the present invention using the first polymerizable monomer and the second polymerizable monomer is the same as the polymerization method of the first polymerizable monomer described above, and thus the description thereof is omitted here.

The polymer according to the present invention preferably has a peak molecular weight obtained from the molecular weight distribution in terms of polystyrene measured by gel permeation chromatography (GPC) in the range of 3500 to 35000. More preferably, it is in the range of 10000 to 30000. When the peak molecular weight is within such a range, it is preferable that the polymer has an appropriate melt viscosity at the time of fixing, so that both good fixability and separability after fixing can be achieved.

The peak molecular weight is a molecular weight corresponding to the elution time of the peak top in the molecular weight distribution. When a plurality of peaks exist in the molecular weight distribution, it is referred to the molecular weight corresponds to the elution time of the peak top having the largest peak area ratio.

The peak molecular weight of the polymer can be measured by the following method. Specifically, a device "HLC-8220" (manufactured by Tosoh Corporation) and a column "TSKguardcolumn+TSKgelSuperHZM-M3 series" (manufactured by Tosoh Corporation) are used. Then, tetrahydrofuran (THF) is flowed as a carrier solvent at a flow rate of 0.2 ml/min while keeping the column temperature at 40 °C. The measured sample is dissolved in tetrahydrofuran so as to be in a concentration of 1 mg/ml under the dissolution condition of performing treatment for 5 minutes using an ultrasonic disperser at the room temperature (25 °C).

The solution is then treated with a membrane filter having a pore size of 0.2 μm to obtain a sample solution. 10 μL of the sample solution is injected into the device together with the carrier solvent described above, detected using a refractive index detector (RI detector), and measured from the molecular weight distribution of the measured sample.

The content ratio of the polymer according to the present invention is preferably in the range of 65 to 99% by mass, with the total mass of the toner binder according to the present invention being 100% by mass. More preferably, it is in the range of 70 to 97% by mass, and further preferably in the range of 75 to 95% by mass. When the content ratio is within the above range, low-temperature fixability and separability after fixing are well balanced.

The toner binder according to the present invention may contain other one or more resins other than the polymer according to the present invention. As the other one or more resins, a resin which is generally used as a toner binder constituting the toner can be used without limitation.

Specific examples thereof include a polyester resin, a silicone resin, a polyolefin resin, a polyamide resin, and an epoxy resin. These other one or more resins may be used alone or in combination of two or more.

Hereinafter, a Polyester Resin that can be Used as a Toner Binder will be Described.

Polyester Resin

The polyester resin is a known polyester resin obtained by a polycondensation reaction of a carboxylic acid having a valence of 2 or more (polycarboxylic acid component) and an alcohol having a valence of 2 or more (polyhydric alcohol component). Note that the polyester resin may be amorphous or crystalline.

The valence of each of the polycarboxylic acid component and the polyhydric alcohol component is preferably 2 to 3, and particularly preferably 2. Therefore, as a particularly preferred form, a case where each valence is 2 (that is, a dicarboxylic acid component and a diol component) will be described.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedicarboxylic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; unsaturated aliphatic dicarboxylic acids such as methylene succinic acid, fumaric acid, maleic acid, 3-hexenedioic acid, 3-octenedioic acid, and dodecenylsuccinic acid; unsaturated aromatic dicarboxylic acids such as phthalic acid, terephthalic acid, isophthalic acid, t-butylisophthalic acid, tetrachlorophthalic acid, chlorophthalic acid, nitrophthalic acid, p-phenylenediacetic acid, 2,6-naphthalenedicarboxylic acid. 4,4'-biphenyldicarboxylic acid, and anthracene dicarboxylic acid; and the like. These lower alkyl esters and acid anhydrides can also be used. The dicarboxylic acid component may be used alone or in combination of two or more.

In addition, a carboxylic acid having a valence of 3 or more such as trimellitic acid or pyromellitic acid, an anhydride of the above carboxylic acid compound, an alkyl ester having 1 to 3 carbon atoms, or the like can also be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecandiol, 1,13-tridecanediol, 1,14-tetradecanediol, 1,18-octadecanediol, 1,20-eicosanediol, and neopentyl glycol; unsaturated aliphatic diols such as 2-butene-1,4-diol, 3-butene-1,4-diol, 2-butyne-1,4-diol, 3-butyne-1,4-diol, and 9-octadecene-7,12-diol; and aromatic diols such as bisphenols such as bisphenol A and bisphenol F, and alkylene oxide adducts of bisphenols such as ethylene oxide adducts and propylene oxide adducts thereof. In addition, derivatives thereof can also be used. The diol component may be used alone or in combination of two or more.

The method for producing the polyester resin is not particularly limited. The production method can be produced by polycondensation (esterification) of the above polycarboxylic acid component and the polyhydric alcohol component using a known esterification catalyst.

Catalysts that can be used in the production of polyester resins include alkali metal compounds such as sodium and lithium; compounds containing group 2 elements such as magnesium and calcium; compounds of metals such as aluminum, zinc, manganese, antimony, titanium, tin, zirconium, and germanium; phosphite compounds; phosphoric acid compounds; and amine compounds. Specifically, examples of the tin compound include dibutyltin oxide, tin octylate, tin dioctylate, and salts thereof.

Examples of the titanium compound include titanium alkoxides such as tetranormal butyl titanate (Ti(O-n-Bu)4), tetraisopropyl titanate, tetramethyl titanate, and tetrastearyl titanate; titanium acylates such as polyhydroxytitanium stearate; and titanium chelates such as titanium tetraacetylacetonate, titanium lactate, and titanium triethanolaminate.

Examples of the germanium compound include germanium dioxide.

Further, examples of the aluminum compound include polyaluminum hydroxide, aluminum alkoxide, and tributylaluminate. These may be used alone or in combination of two or more.

The polymerization temperature is not particularly limited, but is preferably in the range of 70 to 250 °C. The polymerization time is also not particularly limited, but is preferably 0.5 to 10 hours. During polymerization, the reaction system may be depressurized as necessary.

The above polyester resin may be a hybrid polyester resin having a graft copolymer structure of a polyester polymerization segment and a styrene-acrylic polymerization segment graft.

The content of the polymer according to the present invention in the toner binder is preferably in the range of 5 to 50% by mass, and more preferably in the range of 10 to 35% by mass, with the total mass of the binder resin being 100% by mass.

Release Agent

The Toner Base Particles According to the Present Invention Contain a Release Agent.

Examples of a fatty acid ester contained in the release agent include behenyl behenate, stearyl stearate, behenyl stearate, stearyl behenate, butyl stearate, propyl oleate, hexadecyl palmitate, methyl lignocerate, glycerin monostearate (glyceryl stearate), diglyceryl distearate, pentaerythritol tetrabehenate (pentaerythritol tetrabehenate ester), diethylene glycol monostearate, dipropylene glycol distearate, sorbitan monostearate, cholesteryl stearate, trimethylolpropane tribehenate, pentaerythritol diacetate dibehenate, glycerin tribehenate, tristearyl trimellitate, distearyl maleate, and methyl triacontanate. These fatty acid esters may be used alone or in combination of two or more.

As the fatty acid ester, a commercially available product or a synthetic product may be used.

From the viewpoint of interaction with the polymer according to the present invention, the fatty acid ester preferably contains a fatty acid ester having 16 to 24 carbon atoms. Examples of such a fatty acid include stearic acid, arachidic acid, behenic acid, and lignoceric acid.

More preferred release agent is at least one of behenyl behenate (the number of carbon atoms in fatty acid ester is 22) and pentaerythritol tetrabehenate (pentaerythritol tetrabehenic acid ester, the number of carbon atoms in fatty acid ester is 22), ethylene glycol distearate (the number of carbon atoms in fatty acid ester is 18), methyl lignoceric acid (the number of carbon atoms in fatty acid ester is 24), and hexadecyl palmitate (the number of carbon atoms in fatty acid ester is 16). Particularly, behenyl behenate, pentaerythritol tetrabehenic acid ester or ethylene glycol distearate is preferable.

The release agent may contain other waxes other than a fatty acid ester.

Examples of such other waxes include polyolefin waxes such as low molecular weight polyethylene and low molecular weight polypropylene, branched chain hydrocarbon waxes such as microcrystalline wax, long chain hydrocarbon waxes such as paraffin wax and sasol wax, dialkyl ketone waxes such as distearyl ketone, fatty acid amide waxes such as ethylenediamine behenylamide and trimellitic acid tristearylamide, and the like.

The content ratio of the release agent is preferably in the range of 1 to 25% by mass, with the total mass of the polymer according to the present invention being 100% by mass, from the viewpoint of balance of fixability and offset resistance. More preferably, it is in the range of 5 to 20% by mass.

The toner base particles used in the present invention may contain a colorant and a charge control agent, if necessary.

Colorant

The toner base particles according to the present invention may contain a colorant. As the colorant, generally known dyes and pigments can be used.

Examples of the colorant for obtaining a black toner include carbon black, magnetic material, and iron-titanium composite oxide black. Examples of the carbon black include channel black, furnace black, acetylene black, thermal black, and lamp black. Examples of the magnetic material include ferrite and magnetite.

Examples of the colorant for obtaining a yellow toner include dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment Yellow 14, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

Examples of the colorant for obtaining a magenta toner include dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of the colorant for obtaining a cyan toner include dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; pigments such as C.I. Pigment Blue 1, C.I. Pigment Blue 7, C.I. Pigment Blue 15, C.I. Pigment Blue 60, C.I. Pigment Blue 62, C.I. Pigment Blue 66, and C.I. Pigment Blue 76.

The colorant for obtaining the toner of each color may be used alone or in combination of one or two or more kinds for each color.

The content ratio of the colorant is preferably in the range of 0.5 to 20% by mass, and more preferably in the range of 2 to 10% by mass, with the total mass of the toner being 100% by mass.

Charge Control Agent

The toner base particles according to the present invention may contain a charge control agent.

The charge control agent used is not particularly limited as long as it is a substance capable of imparting a positive or negative charge by triboelectrification and is colorless. Therefore, as the charge control agent, various known positive charge control agents and negative charge control agents can be used.

Specifically, examples of the positive charge control agent include nigrosine-based dyes such as "Nigrosine Base EX" (manufactured by Orient Chemical Industries Co., Ltd.), quaternary ammonium salts such as "Quaternary ammonium salt P-51" (manufactured by Orient Chemical Industries Co., Ltd.), and "Copy charge PX VP435" (manufactured by Hoechst Japan Co., Ltd.), alkoxylated amines, alkylamides, molybdate chelate pigments, and imidazole compounds such as "PLZ1001" (manufactured by Shikoku Chemicals Corporation).

Further, examples of the negative charge control agent include metal complexes such as "Bontron (registered trademark) S-22", "Bontron (registered trademark) S-34", "Bontron (registered trademark) E-81", "Bontron (registered trademark) E-84" (manufactured by Orient Chemical Industries Co., Ltd.), and "Spilon Black TRH" (manufactured by Hodogaya Chemical Co., Ltd.), thioindigo pigments, quaternary ammonium salts such as "Copy charge NX VP434" (manufactured by Hoechst Japan Co., Ltd.), calixarene compounds such as "Bontron (registered trademark) E-89" (manufactured by Orient Chemical Industries Co., Ltd.), boron compounds such as "LR147" (manufactured by Japan Carlit Co., Ltd.), fluorine compounds such as magnesium fluoride and carbon fluoride and the like.

As the metal complex used as the negative charge control agent, other than those described above, those having various structures such as an oxycarboxylic acid metal complex, a dicarboxylic acid metal complex, an amino acid metal complex, a diketone metal complex, a diamine metal complex, an azo group-containing benzene-benzene derivative skeleton metal complex, and an azo group-containing benzene-naphthalene derivative skeleton metal complex can be used.

As described above, since the toner base particles contain the charge control agent, the chargeability of the toner is improved.

The content ratio of the charge control agent in the toner is preferably in the range of 0.01 to 30% by mass, and more preferably in the range of 0.1 to 10% by mass.

The form of the toner base particles according to the present invention is not particularly limited, and may have a form of, for example, a so-called single-layer structure, a core-shell structure, a multi-layer structure of three or more layers, a domain-matrix structure, or the like. The single-layer structure refers to a homogeneous structure that is not a core-shell structure.

External Additive

The toner of the present invention may be formed by adding external additives such as a fluidizing agent or a cleaning aid, which is a so-called post-treatment agent, to the toner base particles. By adding such an external additive, the fluidity, chargeability, cleaning property, and the like of the toner can be improved.

Examples of the external additive include inorganic particles such as inorganic oxide particles such as silica particles, alumina particles, and titanium oxide particles, inorganic stearate particles such as aluminum stearate particles and zinc stearate particles, and inorganic titanate compound particles such as strontium titanate particles and zinc titanate particles. These may be used alone or in combination of two or more.

These inorganic particles may be subjected to the surface treatment with a silane coupling agent, a titanium coupling agent, a higher fatty acid, a silicone oil, or the like in order to improve heat-resistant storage stability and environmental stability.

The addition amount of the external additive is preferably in the range of 0.05 to 5 parts by mass, and more preferably in the range of 0.1 to 3 parts by mass with respect to 100 parts by mass of the toner base particles.

Average Particle Size of Toner

The average particle size of the toner is preferably in the range of 4 to 10 μm and more preferably in the range of 5 to 9 μm in terms of the volume-based median diameter (D50). When the volume-based median diameter (D50) is within the above range, the transfer efficiency is increased, the image quality of the halftone is improved, and the image quality of the thin lines, the dots, and the like is improved.

In the present invention, the volume-based median diameter (D50) of the toner is measured and calculated using a measuring device in which a computer system (manufactured by Beckman Coulter Co., Ltd.) equipped with data-processing software "Software V3.51" is connected to "Coulter Counter 3" (manufactured by Beckman Coulter Co., Ltd.).

Specifically, 0.02 grams of a measured sample (toner) is added to 20 ml of a surfactant solution and mixed. The surfactant solution is for dispersing toner particles, and is, for example, a surfactant solution obtained by diluting a neutral detergent containing surfactant components 10 times with pure water.

Thereafter, ultrasonic dispersion is performed for 1 minute to prepare a toner dispersion. The toner dispersion is pipetted into a beaker containing "ISOTONII" (manufactured by Beckman Coulter Co., Ltd.) in a sample stand until the concentration displayed on the measuring device is 8%.

Here, by setting the concentration range, reproducible measurement values can be obtained. In the measuring device, the number of measured particle counts is set to 25,000, the aperture diameter is set to 50 μm, and the frequency value is calculated by dividing the measurement range of 1 to 30 μm by 256. Then, the particle diameter of 50% from the larger volume integrated fraction is defined as the volume-based median diameter (D50).

Method for Manufacturing Toner

The method for manufacturing a toner according to the present invention includes a step of polymerizing a first polymerizable monomer having a structure represented by the general expression (2) and preparing a toner binder particle dispersion liquid containing the release agent.

In addition, the method for manufacturing a toner of the present invention may include a step of preparing the toner binder particle dispersion liquid, and other steps are not particularly limited.

For example, a polymer, a release agent, a colorant, and the like according to the present invention can be melt-kneaded, and then pulverized and classified to obtain a toner.

In addition, polymer particles are prepared by emulsion polymerization, mini-emulsion polymerization, or the like of the polymerizable monomer in an aqueous medium. Then, the toner can be obtained by an emulsion aggregation method in which dispersed particles such as the polymer particles, release agent particles, and, if necessary, colorant particles are aggregated and fused.

As the emulsion aggregation method, the methods described in JP H05-265252A, JP H06-329947A. JP H09-15904A and the like can be employed.

Furthermore, a manufacturing method using a suspension polymerization method described in JP 2010-191043A may be used.

In particular, it is preferable to use a manufacturing method using an emulsion aggregation method from the viewpoint that the particle diameter and the shape can be easily controlled and the energy-cost at the time of manufacturing can be reduced.

The manufacturing method using such an emulsion aggregation method preferably includes the following steps.

(1A) Toner binder particle dispersion liquid preparing step for preparing a dispersion liquid of toner binder particles (1B) Colorant particle dispersion liquid preparing step for preparing a dispersion liquid of colorant particles (1C) Release agent particle dispersion liquid preparing step for preparing a dispersion liquid of release agent particles (2) Association step of adding a flocculant to an aqueous medium in which toner binder particles, colorant particles and release agent particles are present, allowing salting out to proceed, and simultaneously performing aggregation and fusion to form associated particles (3) Ripening step of forming toner particles by controlling the shape of the associated particles (4) Filtration and washing step of filtering off toner particles from an aqueous medium and removing surfactant or the like from the toner particles (5) Drying step of drying the cleaned toner particles (6) External additive adding step of adding an external additive to the dried toner particles Hereinafter, the steps of (1A) to (1C) will be described.

(1A) Toner Binder Particle Dispersion Liquid Preparing Step

In this step, resin particles are formed by a conventionally known emulsion polymerization or the like, and the resin particles are aggregated and fused to form binder resin particles. As an example, a polymerizable monomer constituting the binder resin (the first polymerizable monomer and the second polymerizable monomer) is charged into an aqueous medium and dispersed, and these polymerizable monomers are polymerized by a polymerization initiator. Thus, a dispersion liquid of the binder resin particles is prepared.

Further, as a method for obtaining a toner binder particle dispersion liquid, there is the following method in addition to the method for polymerizing a polymerizable monomer with a polymerization initiator in the above-described aqueous medium. For example, there is a method in which a dispersing treatment is performed in an aqueous medium without using solvent. Alternatively, the polymer may be dissolved in an organic solvent such as ethyl acetate to form a solution, and the solution may be emulsified and dispersed in an aqueous medium using a disperser, followed by solvent treatment.

At this time, a release agent may be preliminarily contained in the toner binder, if necessary. For dispersing, it is also preferable to polymerize in the presence of a known surfactant as appropriate. Examples of the known surfactant include anionic surfactants such as sodium polyoxyethylene (2) dodecyl ether sulfate, sodium dodecyl sulfate, and sodium dodecyl benzene sulfonate.

The volume-based median diameter of the toner binder particles in the dispersion liquid is preferably in the range of 50 to 300 nm. The volume-based median diameter of the binder resin particles in the dispersion liquid can be measured by a dynamic light scattering method using "Microtrac UPA-150" (manufactured by Nikkiso Co., Ltd.).

(1B) Colorant Particle Dispersion Liquid Preparing Step

The colorant particle dispersion liquid preparation step is a step of preparing a dispersion liquid of colorant particles by dispersing the colorant in a fine particle form in an aqueous medium.

The colorant can be dispersed using mechanical energy. The volume-based median diameter of the colorant particles in the dispersion liquid is preferably in the range of 10 to 300 nm, more preferably in the range of 50 to 200 nm.

The volume-based median diameter of the colorant particles in the dispersion liquid can be measured by a dynamic light scattering method using "Microtrac UPA-150" (manufactured by Nikkiso Co., Ltd.) as described above.

(1C) Release Agent Particle Dispersion Liquid Preparing Step

The release agent particle dispersion liquid preparing step is a step of preparing a dispersion liquid of release agent particles by dispersing the release agent in a fine particle form in an aqueous medium.

The release agent can be dispersed using mechanical energy.

The volume-based median diameter of the release agent particles in the dispersion liquid is preferably in the range of 100 to 1000 nm, and more preferably in the range of 200 to 700 nm.

The volume-based median diameter of the release agent particles in the dispersion liquid can be measured, for example, with a a laser diffraction particle size distribution analyzer LA-750 (manufactured by Horiba, Ltd.).

Aqueous Medium

Examples of the aqueous medium used in the steps of (1A) to (1C) include water or an aqueous medium containing water as a main component (50% by mass or more) and an optional component such as a water-soluble solvent such as alcohols and glycols, and surfactant and dispersing agent. The aqueous medium is preferably a mixture of water and surfactant.

Examples of the water-soluble solvent include methanol, ethanol, isopropanol, butanol, acetone, methyl ethyl ketone, and tetrahydrofuran. Of these, alcohols such as methanol, ethanol, isopropanol, and butanol, which are organic solvent that do not dissolve the polymer, are preferable.

Examples of the surfactant include a cationic surfactant, an anionic surfactant, and a nonionic surfactant. Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide. Examples of the anionic surfactant include fatty acid soaps such as sodium stearate and sodium dodecanoate, sodium dodecylbenzenesulfonate, and sodium dodecylsulfate. Examples of the nonionic surfactant include polyoxyethylene dodecyl ether, polyoxyethylene hexadecyl ether, polyoxyethylene nonyl phenyl ether, polyoxyethylene lauryl ether, polyoxyethylene sorbitan monooleate ether, and monodecanoyl sucrose.

Such surfactants may be used alone or in combination of two or more. Among the surfactants, anionic surfactants are preferably used, and sodium dodecylbenzene sulfonate and sodium dodecyl sulfate are more preferably used.

The addition amount of the surfactant is preferably in the range of 0.01 to 10 parts by mass, and more preferably in the range of 0.04 to 2 parts by mass with respect to 100 parts by mass of the aqueous medium.

The steps of (2) Association step to (6) External additive adding step can be performed according to various methods known in the art.

The flocculant used in (2) Association step is not particularly limited, but a flocculant selected from metal salts is preferably used.

Examples of the metal salt include monovalent metal salts such as alkali metal salts such as sodium, potassium, and lithium; divalent metal salts such as calcium, magnesium, manganese, and copper; and trivalent metal salts such as iron and aluminum.

Specific examples of the metal salt include sodium chloride, potassium chloride, lithium chloride, calcium chloride, magnesium chloride, zinc chloride, copper sulfate, magnesium sulfate, manganese sulfate, and polyaluminum chloride. Among these, it is particularly preferable to use a divalent or trivalent metal salt because aggregation can proceed in a smaller amount. These may be used alone or in combination of two or more.

Developer

The toner of the present invention can be suitably used as the following toner. Examples thereof include a case where the toner contains a magnetic material and is used as a one-component magnetic toner, a case where the toner is mixed with a so-called carrier and used as a two-component developer, or a case where a non-magnetic toner is used alone. The toner of the present invention can be suitably used in any of the above-described cases.

As the magnetic material, for example, magnetite. γ-hematite, or various ferrites can be used.

As the carrier constituting the two-component developer, magnetic particles made of conventionally known materials such as metals such as iron, steel, nickel, cobalt, ferrite, and magnetite, and alloys of these metals with metals such as aluminum and lead can be used.

As the carrier, it is preferable to use a coat carrier in which the surface of the magnetic particles is coated with a coating agent such as a resin, or a so-called resin-dispersed carrier in which a magnetic powder is dispersed in a binder resin.

The resin for the coating is not particularly limited, for example, olefin resin, styrene resin, styrene-acrylic resin, silicone resin, polyester resin, or fluororesin is used.

The resin for forming the resin-dispersed carrier is not particularly limited, and a known resin can be used. As such a resin, for example, acrylic resin, styrene-acrylic resin, polyester resin, fluororesin, phenolic resin, or the like can be used.

The volume-based median diameter of the carrier is preferably in the range of 20 to 100 μm, more preferably in the range of 25 to 60 μm.

The volume-based median diameter of the carrier can be measured by a laser diffraction particle size distribution measuring device, typically equipped with a wet disperser. Examples of the laser diffraction particle size distribution measuring device include "HELOS" (manufactured by SYMPATEC).

The mixing amount of the toner with respect to the carrier is preferably in the range of 2 to 10% by mass, with the total mass of the toner and the carrier being 100% by mass.

Image Forming Method

The toner of the present invention can be suitably used in an image forming method including a fixing step by a thermal pressure fixing method capable of applying pressure and heating. In particular, the toner can be suitably used in an image forming method in which the fixing temperature in the fixing step is relatively low. The fixing temperature is in the range of 115 to 140 °C, preferably 115 to 130 °C, in the surface temperature of the heat member in the fixing nip part.

Further, the toner can also be suitably used in an image forming method of high-speed fixing in which the fixing linear velocity is in the range of 200 to 600 mm/sec.

In the image forming method, specifically, the toner of the present invention is used to develop an electrostatic image formed on, for example, a photoreceptor to obtain a toner image, and the toner image is transferred to an image support. Thereafter, the toner image transferred onto the image support is fixed to the image support by a fixing process using a thermal pressure-fixing method, whereby a printed product on which a visible image is formed is obtained.

Further, the toner of the present invention can be used in a monochrome image forming method or a full-color image forming method.

In the full-color image forming method, the toner can be applied to a four-cycle image forming method including four types of color developing apparatuses for each of yellow, magenta, cyan, and black, and one photoreceptor. Further, the toner can also be applied to a tandem type image forming method in which an image forming unit having color developing apparatuses for each color and a photoreceptor are mounted for each color. The toner of the present invention can be applied to any of the above image forming methods.

EXAMPLES

Hereinafter, the present invention will be described in detail with reference to Examples, but the present invention is not limited thereto. In Examples below, unless otherwise specified, the operations were performed at room temperature)(25 °C). Unless otherwise specified, "%" and "part" mean "% by mass" and "part by mass", respectively.

The peak molecular weight of the polymer contained in the binder resin of each toner shown below was measured as follows. The measurement results are shown in the following table.

A device "HLC-8220" (manufactured by Tosoh Corporation) and a column "TSKguardcolumn+TSKgelSuper-HZM-M3 series" (manufactured by Tosoh Corporation) were used. Tetrahydrofuran (THF) was flowed as a carrier solvent at a flow rate of 0.2 ml/min while keeping the column temperature at 40 °C. Then, the measured sample was dissolved in tetrahydrofuran so as to be in a concentration of 1 mg/ml under the dissolution condition of performing treatment for 5 minutes using an ultrasonic disperser at the room temperature (25 °C).

The solution was then treated with a membrane filter having a pore size of 0.2 μm to obtain a sample solution, and 10 μL of the sample solution was injected into the device together with the carrier solvent described above. Then, it was detected using a refractive index detector (RI detector) and determined from the molecular weight distribution of the measured sample.

Manufacturing of Toner 1

<Preparation of Binder Resin Particle Dispersion Liquid>

A 5L stainless-steel cauldron (SUS cauldron) equipped with a stirring device, a thermal sensor, a condenser, and a nitrogen-introducing device was charged with a surfactant solution in which 8 grams of sodium dodecyl sulfate was dissolved in 3 L of an ion-exchanged water. Then, the solution temperature was raised to 80 °C while stirring at a stirring rate of 230 rpm in a nitrogen stream.

To this surfactant solution, an initiator solution in which 10 grams of potassium persulfate was dissolved in 200 grams of an ion-exchanged water was added, and heated to 80 °C. Thereafter, the following monomer mixture was added dropwise over 100 minutes, and the system was heated at 80 °C for 2 hours and stirred to carry out the polymerization. Thus, the binder resin particle dispersion liquid (toner binder particle dispersion liquid) 1 was prepared.

| -Monomer mixture- | |
|---|---|
| Exemplary compound M1 | 161 g |
| Styrene (St) | 467 g |
| n-Butyl acrylate (BA) | 161 g |
| Acrylic acid (AA) | 16 g |
| n-octyl-3-mercaptopropionate | 5.5 g |

The volume-based median diameter of the binder resin particles in the obtained binder resin particle dispersion liquid 1 was measured by a dynamic light scattering method using "Microtrac UPA-150" (manufactured by Nikkiso Co., Ltd.) and found to be 128 nm.

| <Preparation of Colorant dispersion liquid 1> | |
|---|---|
| Colorant: Carbon black (Mogul (registered trademark) L manufactured by Cabot Corporation) | 10 parts by mass |
| Anionic surfactant (sodium dodecylbenzene sulfonate 20% aqueous solution) | 1.5 parts by mass |
| Ion-exchanged water | 90 parts by mass |

The above components were mixed and dispersed in a SC mill to obtain a colorant dispersion liquid 1. The volume-based median diameter of the colorant particles in the dispersion liquid was measured by a dynamic light scattering method using "Microtrac UPA-150" (manufactured by Nikkiso Co., Ltd.) and found to be 154 nm.

| <Preparation of Release agent dispersion liquid 1> | |
|---|---|
| Behenyl behenate | 100 parts by mass |
| Sodium dodecyl sulfate | 5 parts by mass |
| Ion-exchanged water | 240 parts by mass |

The above components were dispersed in a round stainless-steel flask for 10 minutes using a homogenizer "ULTRA-TURRAX (registered trademark) T50" (manufactured by IKA Japan K.K.). Thereafter, the mixture was dispersed by a pressure discharge type homogenizer to obtain a release agent dispersion liquid 1. The volume-based median diameter of the release agent particles in the dispersion liquid was measured by a laser diffraction particle size distribution analyzer LA-750 (manufactured by Horiba, Ltd.) and found to be 530 nm.

| <Preparation of Toner base particle dispersion liquid 1> | |
|---|---|
| Binder resin particle dispersion liquid 1 | 237 parts by mass |
| Colorant dispersion liquid 1 | 42 parts by mass |
| Release agent dispersion liquid 1 | 18 parts by mass |
| Polyaluminum chloride | 1.8 parts by mass |
| Ion-exchanged water | 600 parts by mass |

The above components were mixed and dispersed in a round stainless-steel flask using a homogenizer "ULTRA-TURRAX (registered trademark) T50" (manufactured by IKA Japan K.K.). Thereafter, the mixture was heated to 55 °C in a heating oil bath with stirring the inside of the flask. After holding at 55 °C for 30 minutes, it was confirmed that aggregated particles having a volume-based median diameter (D50) of 4.8 μm were formed in the solution.

When the temperature of the heating oil bath was further increased and held at 56 °C for 2 hours, the volume-based median diameter (D50) was 5.9 μm.

Thereafter, pH of the system was adjusted to 5.0 by adding 1 mol/L of sodium hydroxide into the system, and then the stainless-steel flask was sealed with a magnetic seal and heated to 98 °C while continuing to stir. By continuing stirring for 6 hours, fusion between the binder resin particles was completed, and the toner base particle dispersion liquid 1 was prepared. The volume-based median diameter (D50) of the toner base particles in the dispersion liquid was 6.0 μm.

Cleaning and Drying Step

The toner base particle dispersion liquid 1 was subjected to solid-liquid separation using a basket-type centrifuge "MARKIII model number 60×40" (manufactured by Matsumoto Machine Sales Co., Ltd.) to form a wet cake of toner base particles.

The wet cake was washed with an ion-exchanged water at 45 °C until the filtrate had an electrical conductivity of 5 μS/cm in the above basket-type centrifuge, was then transferred to "Flash jet dryer" (manufactured by Seishin Enterprise Co., Ltd.) and dried to a water content of 0.5% by mass to obtain toner base particles.

External Additive Treatment of Toner Base Particles

To 100 parts by mass of the toner base particles obtained above, 1 part by mass of hydrophobic silica (number average primary particle size=12 nm) and 0.3 parts by mass of hydrophobic titania (number average primary particle size=20 nm) were added. Then, the mixture was mixed by a Henschel mixer (registered trademark) and subjected to an external additive treatment to manufacture a toner 1.

Manufacturing of Toners 2 to 23

Each binder resin particle dispersion liquid was prepared in the same manner, except that the combinations and the addition amounts of the first and second polymerizable monomers were changed as described in Tables I and II below in the preparation of the binder resin particle dispersion liquid 1 described above.

In addition, $R_1$ to $R_3$ of the first polymerizable monomer described in Tables I and II below represents $R_1$ to $R_3$ in the general expression (2).

The first polymerizable monomer used in the preparation of the binder resin particle dispersion liquid 14 is the following Comparison compound 1. The first polymerizable monomer used in the preparation of the binder resin particle dispersion 15 is the following Comparison compound 2.

Comparison compound 1

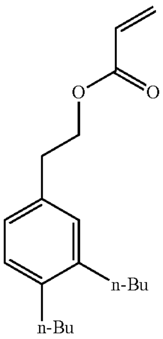

Comparison compound 2

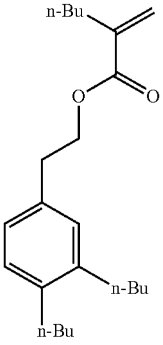

Each release agent dispersion liquid was prepared in the same manner, except that the type and the addition amount of the release agent were changed as described in Table III below in the preparation of the release agent dispersion liquid 1 described above.

Then, toners 2 to 23 were manufactured in the same manner as in the manufacture of the toner 1, except that the toner base particles were prepared using the binder resin particle dispersion liquid, the colorant dispersion liquid, the release agent dispersion liquid, the polyaluminum chloride, and the ion-exchanged water so as to have the contents and the compositions described in Tables IV to VI below.

The volume-based median diameters of the binder resin particles in the binder resin particle dispersion liquids prepared by combining and adding the monomers in Tables I and II below were 128 nm in all cases.

In addition, the volume-based median diameters of the release agent particles in the release agent dispersion liquids prepared using the release agents described in Table III below were as follows.

Paraffin (Paraffin wax, HNP-51, manufactured by Nippon Seiro Co., Ltd.): 600 nm

Pentaerythritol tetrabehenate: 490 nm

Ethylene glycol distearate: 380 nm

Stearyl stearate: 460 nm

Methyl lignoceric acid: 430 nm

Hexadecyl palmitate: 450 nm

Methyl triacontanate: 450 nm

In Tables I and II below, St represents styrene, MMA represents methyl methacrylate, nBA represents n-butyl acrylate, iBA represents iso-butyl acrylate, 2EHA represents 2-ethylhexyl acrylate, MAA represents methacrylic acid, and AA represents acrylic acid.

The addition amount of the first polymerizable monomer and the addition amount of the second polymerizable monomer in Tables I and II represent the respective addition amounts when the total addition amount of the first and second monomers is taken as 100% by mass. The addition amount of the release agent shown in Table III represents the addition amount of the release agent in the release agent dispersion liquid.

In the tables below, “H” represents a hydrogen atom, “Me” represents a methyl group, “n-Pro” represents a n-propyl group, “iso-Pro” represents a iso-propyl group, “OMe” represents a methoxy group, “O-n-Pro” represents a n-propoxy group, and “n-Bu” represents a n-butyl group.

Preparation of Two-Component Developer 100 parts by mass of ferrite particles (volume-based median diameter: 50 μm (manufactured by Powdertech Co., Ltd.)) and 4 parts by mass of methyl methacrylate-cyclohexyl methacrylate copolymer resin (volume-based median diameter of primary particles: 85 nm) were placed in a horizontal-stirring blade-type high-speed stirring device and mixed for 15 minutes at a peripheral speed of a stirring blade: 8 m/s, and a temperature: 30 °C. Then, the temperature was raised to 120 °C and stirring was continued for 4 hours. The mixture was then cooled and removed the fragments of the methyl methacrylate-cyclohexyl methacrylate copolymer resin using a sieve of 200 mesh to prepare the resin-coated carrier.

The resin-coated carrier was mixed with each of the above-described toners 1 to 23 so that a toner concentration was 7% by mass based on the total mass of the toner and the carrier to prepare two-component developers 1 to 23.

TABLE I

| Binder resin particle dispersion liquid No. | | 1 | 2 | 3 | 4 | 5 | 6 | 7 | 8 |
|---|---|---|---|---|---|---|---|---|---|
| First polymerizable monomer | $R_1$ | H | Me | n-Pro | iso-Pro | H | H | H | H |
| | $R_2$ | H | H | H | H | Me | n-Pro | OMe | H |
| | $R_3$ | H | H | H | H | H | H | H | Me |
| | Addition amount [% by mass] | 20.0 | 20.0 | 10.0 | 35.0 | 5.0 | 40.0 | 20.0 | 20.0 |

TABLE I-continued

| Binder resin particle dispersion liquid No. | | 1 | 2 | 3 | 4 | 5 | 6 | 7 | 8 |
|---|---|---|---|---|---|---|---|---|---|
| Addition | St | 58.0 | 52.0 | 60.0 | 43.0 | 64.0 | 37.0 | 53.0 | 52.0 |
| amount of | nBA | 20.0 | 23.0 | 15.0 | 18.0 | 20.0 | 16.0 | 15.0 | 22.0 |
| Second | IBA | 0.0 | 0.0 | 5.0 | 0.0 | 0.0 | 0.0 | 0.0 | 0.0 |
| polymerizable | 2EHA | 0.0 | 0.0 | 6.0 | 0.0 | 6.0 | 0.0 | 6.0 | 0.0 |
| monomer | MAA | 0.0 | 5.0 | 4.0 | 4.0 | 5.0 | 7.0 | 6.0 | 6.0 |
| [Si by mass] | AA | 2.0 | 0.0 | 0.0 | 0.0 | 0.0 | 0.0 | 0.0 | 0.0 |
| Peak molecular weight | | 21250 | 22100 | 21900 | 22000 | 21600 | 22100 | 19500 | 22900 |

TABLE II

| Binder resin particle dispersion liquid No. | | 9 | 10 | 11 | 12 | 13 | 14 | 15 | 16 |
|---|---|---|---|---|---|---|---|---|---|
| First | $R_1$ | n-Pro | iso-Pro | H | Me | H | H | n-Bu | — |
| polymerizable | $R_2$ | H | H | Me | OMe | H | n-Bu | n-Bu | — |
| monomer | $R_3$ | n-Pro | O-n-Pro | Me | OMe | H | n-Bu | n-Bu | — |
| | Addition amount [% by mass] | 15.0 | 25.0 | 20.0 | 20.0 | 20.0 | 20.0 | 20.0 | 0.0 |
| Addition | St | 60.0 | 49.0 | 52.0 | 51.0 | 53.0 | 58.0 | 52.0 | 63.0 |
| amount of | nBA | 22.0 | 21.0 | 18.0 | 18.0 | 16.0 | 20.0 | 17.0 | 31.0 |
| Second | iBA | 0.0 | 0.0 | 5.0 | 0.0 | 0.0 | 0.0 | 0.0 | 0.0 |
| polymerizable | 2EHA | 0.0 | 0.0 | 0.0 | 4.0 | 5.0 | 0.0 | 5.0 | 0.0 |
| monomer | MAA | 1.0 | 5.0 | 5.0 | 7.0 | 6.0 | 0.0 | 6.0 | 6.0 |
| [% by mass] | AA | 2.0 | 0.0 | 0.0 | 0.0 | 0.0 | 2.0 | 0.0 | 0.0 |
| Peak molecular weight | | 20050 | 21050 | 19600 | 21050 | 21000 | 21950 | 21800 | 21950 |

TABLE III

| Release agent dispersion liquid No. | | 1 | 2 | 3 | 4 | 5 | 6 | 7 | 8 |
|---|---|---|---|---|---|---|---|---|---|
| Release agent | Kind (Numbers in parentheses indicate the number of carbon atoms in fatty acid) | Behenyl behenate (22) | HNP51 Paraffin) | *1 | *2 | *3 | *4 | Hexadecyl palmitate (16) | Methyl triacontanate (30) |
| | Addition amount [parts by mass] | 29 | 29 | 29 | 29 | 29 | 29 | 29 | 29 |

*1: Pentaerythritol tetrabehenate (22)
*2: Ethylene glycol distearate (18)
*3: Stearyl stearate (18)
*4: Methyl lignoceric acid (24)

TABLE IV

| Toner No. | 1 | 2 | 3 | 4 | 5 | 6 | 7 | 8 |
|---|---|---|---|---|---|---|---|---|
| Binder resin particle dispersion liquid No. | 1 | 2 | 3 | 4 | 5 | 6 | 7 | 8 |
| Binder resin particle dispersion liquid [parts by mass] | 237 | 237 | 237 | 237 | 237 | 237 | 237 | 237 |
| Colorant dispersion liquid 1 [parts by mass] | 42 | 42 | 42 | 42 | 42 | 42 | 40 | 40 |
| Release agent dispersion liquid No. | 1 | 1 | 1 | 1 | 1 | 1 | 1 | 1 |
| Release agent dispersion liquid [parts by mass] | 19 | 19 | 19 | 19 | 19 | 19 | 5.7 | 9.5 |
| Polyaluminum chloride [parts by mass] | 1.8 | 1.8 | 1.8 | 1.8 | 1.8 | 1.8 | 1.8 | 1.8 |
| Ion-exchanged water [parts by mass] | 600 | 600 | 600 | 600 | 600 | 600 | 600 | 600 |
| Remarks | *1 | *1 | *1 | *1 | *1 | *1 | *1 | *1 |

*1: Present Invention

TABLE V

| Toner No. | 9 | 10 | 11 | 12 | 13 | 14 | 15 | 16 |
|---|---|---|---|---|---|---|---|---|
| Binder resin particle dispersion liquid No. | 9 | 10 | 11 | 12 | 13 | 13 | 13 | 13 |
| Binder resin particle dispersion liquid [parts by mass] | 237 | 237 | 237 | 237 | 237 | 237 | 237 | 237 |
| Colorant dispersion liquid 1 [parts by mass] | 42 | 42 | 42 | 42 | 42 | 42 | 42 | 42 |
| Release agent dispersion liquid No. | 1 | 1 | 1 | 1 | 2 | 3 | 4 | 5 |
| Release agent dispersion liquid [parts by mass] | 19 | 38.5 | 42 | 19 | 19 | 19 | 19 | 19 |
| Polyaluminum chloride [parts by mass] | 1.8 | 1.8 | 1.8 | 1.8 | 1.8 | 1.8 | 1.8 | 1.8 |
| Ion-exchanged water parts by mass] | 600 | 600 | 600 | 600 | 600 | 600 | 600 | 600 |
| Remarks | *1 | *1 | *1 | *1 | *1 | *1 | *1 | *1 |

*1: Present Invention

TABLE VI

| Toner No. | 17 | 18 | 19 | 20 | 21 | 22 | 23 |
|---|---|---|---|---|---|---|---|
| Binder resin particle dispersion liquid No. | 13 | 13 | 13 | 14 | 15 | 16 | 16 |
| Binder resin particle dispersion liquid [parts by mass] | 237 | 237 | 237 | 237 | 237 | 237 | 237 |
| Colorant dispersion liquid 1 [parts by mass] | 42 | 42 | 42 | 42 | 42 | 42 | 42 |
| Release agent dispersion liquid No. | 6 | 7 | 8 | 1 | 1 | 2 | 1 |
| Release agent dispersion liquid [parts by mass] | 19 | 19 | 19 | 19 | 19 | 19 | 19 |
| Polyaluminum chloride [parts by mass] | 1.8 | 1.8 | 1.8 | 1.8 | 1.8 | 1.8 | 1.8 |
| Ion-exchanged water [parts by mass] | 600 | 600 | 600 | 600 | 600 | 600 | 600 |
| Remarks | *1 | *1 | *1 | *2 | *2 | *2 | *2 |

*1: Present Invention
*2: Comparative Example

Evaluation

The two-component developers 1 to 23 were evaluated for the evaluation items (1), (2) and (3) below, and the evaluation results are shown in Table VII below.

(1) Fixability

Commercially available multifunction peripheral "bizhub PRO C6500" (Konica Minolta Business Technologies) was used as an image forming apparatus. This apparatus was provided with the above-mentioned two-component developer as a developer. The surface temperature of the fixing heat member in a fixer of a heat roll fixing method was changed in steps of 5° °C. in the range of 80 to 150 °C. For the respective temperatures, an image was formed using a cardboard weighing 350 g/m$^2$ as a image support in the environment of normal temperature and normal humidity (temperature: 20 °C, humidity 50% RH), and a solid image having an image density of 0.8 was obtained as a visible image. The fixed solid image was then folded using a folding device, and air at 0.35 MPa was blown onto the folded image. The condition of the fold was evaluated in five stages by referring to the criteria sample, and the fixing temperature of Rank 3 was defined as the minimum fixing temperature.

Rank 5: No peeling is observed at the fold

Rank 4: Partial peeling according is observed along the fold

Rank 3: Thin linear peeling according is observed along the fold

Rank 2: Thick peeling is observed along the fold

Rank 1: Large peeling is observed in the image.

A minimum fixing temperature of 130 °C or less indicating Rank 3 level indicates sufficient low-temperature fixability.

(2) Chargeability

The charge amount of the toner was measured using the apparatus shown in FIGURE.

First, 1 gram of the developer weighed with a precision balance was placed uniformly over the entire surface of a conductive sleeve (31). The voltage of 2 kV was supplied from the bias power source (33) to the sleeve (31) and the rotational speed of the magnet roll (32) provided in the conductive sleeve (31) was set to 1000 rpm. This state was left for 30 seconds and the toner was collected in the cylindrical electrode (34). After 30 seconds, the potential Vm of the cylindrical electrode (34) was read, and the electric charge of the toner was determined. Further, the mass of the collected toner was measured by a precision balance, and the average charge amount was determined. The chargeability index was obtained by dividing the average charge amount by the mixing period (mixing at a shaking angle of 30° using a shaker (Yayoi New-YS) and at a shaking speed of 200 strokes/min for 10 minutes).

When the chargeability index is 6.5 μC/g/min or more, a sufficient charge amount without a problem is exhibited even in a high-speed print output.

(3) Separability after Fixing

A modified machine of "bizhub (registered trademark) C754" (manufactured by Konica Minolta, Inc.) was used. A recording material "KINFUJI 85 g/m$^2$ long grain" (manufactured by Oji Paper Co., Ltd.) which was left overnight in a normal temperature and normal humidity environment (temperature: 25 °C, relative-humidity 50% RH) to control the humidity was used.

The test in which the full solid image having the nip width of 11.2 mm, the fixing time of 34 msec, the fixing pressure of 133 kPa, the fixing temperature at which the upper belt reaches 160 °C, and the toner adhesion amount of 4.0 g/m$^2$ was printed on the recording material in a normal temperature and normal humidity environment (temperature: 25 °C, humidity 50% RH) with a tip margin of 8 mm, was repeated while changing the tip margin to be decreased in 1 mm increments, such as 7 mm, 6 mm, and the like until a paper jam occurred.

The smallest tip margin that did not occur the paper jam was investigated to evaluate the separability after fixing. Table VII shows the results. The smaller the smallest tip margin, the better separability after fixing. In the present invention, the evaluation criteria "AA" and "A" are accepted.

(Evaluation Criteria)

AA: Tip margin is lower than 2 mm.

A: Tip margin is lower than 3 mm.

B: Tip margin is lower than 4 mm.

C: Tip margin exceeds 4 mm.

TABLE VII

| | | Evaluation | | | |
|---|---|---|---|---|---|
| Developer No. | Toner No. | Fixability/ Minimum Fixing Temperature [°C] | Chargeability/ Charge index [μC/g/min] | Separability after fixing/ Smallest tip margin (—) | Remarks |
| 1 | 1 | 120 | 8.8 | AA | *1 |
| 2 | 2 | 121 | 7.6 | AA | *1 |
| 3 | 3 | 120 | 6.7 | AA | *1 |
| 4 | 4 | 120 | 9.7 | A | *1 |
| 5 | 5 | 127 | 6.7 | AA | *1 |
| 6 | 6 | 124 | 10.9 | A | *1 |
| 7 | 7 | 120 | 8.3 | A | *1 |
| 8 | 8 | 119 | 8.0 | AA | *1 |
| 9 | 9 | 118 | 8.0 | AA | *1 |
| 10 | 10 | 119 | 8.3 | AA | *1 |
| 11 | 11 | 120 | 7.6 | AA | *1 |
| 12 | 12 | 121 | 8.0 | AA | *1 |
| 13 | 13 | 122 | 8.3 | AA | *1 |
| 14 | 14 | 121 | 8.3 | AA | *1 |
| 15 | 15 | 119 | 8.3 | AA | *1 |
| 16 | 16 | 119 | 8.3 | A | *1 |
| 17 | 17 | 122 | 8.3 | A | *1 |
| 18 | 18 | 117 | 8.3 | A | *1 |

TABLE VII-continued

| | | Evaluation | | | |
|---|---|---|---|---|---|
| Developer No. | Toner No. | Fixability/ Minimum Fixing Temperature [°C] | Chargeability/ Charge index [μC/g/min] | Separability after fixing/ Smallest tip margin (—) | Remarks |
| 19 | 19 | 124 | 8.3 | A | *1 |
| 20 | 20 | 128 | 8.8 | B | *2 |
| 21 | 21 | 126 | 8.0 | B | *2 |
| 22 | 22 | 125 | 5.6 | B | *2 |
| 23 | 23 | 124 | 5.6 | C | *2 |

*1: Present Invention

*2: Comparative Example

As is clear from the results shown in Table VII above, it was found that, by containing the polymer having the structural unit represented by the general expression (1) and the release agent, the toners 1 to 19 of the present invention are excellent in low-temperature fixability and separability after fixing and good chargeability can be obtained.

On the other hand, it was found that separability after fixing was inferior in toners 20 and 21 using polymers having the structure other than the present invention, and further that the chargeability was lowered in toners 22 and 23 using polymers having no structure of the present invention.

The mechanism of expression or action of the effects of the present invention has not been clarified, but it is presumed as follows. It should be noted that the following mechanism is based on presumption, and the present invention is not limited to the following mechanism in any way.

In the following description, the polymer having the structural unit represented by the general expression (1) is also simply referred to as a "polymer according to the present invention".

The toner according to the present invention can suppress contamination inside a machine such as toner scattering while satisfying low-temperature fixability and separability after fixing, and has excellent charging properties. It can be presumed that the reason for this is the interaction between the polymer according to the present invention and the release agent and the low charge leakage of the polymer according to the present invention.

By introducing the polymer according to the present invention into the toner particles, the solubility parameter is increased, so that compatibility with the release agent can be suppressed (that is, made incompatible).

Since compatibility is suppressed, the interaction with the polymer according to the present invention is reduced, and it is possible to quickly seep out between an image and a fixing roller during fixing. Therefore, it can be inferred that good separability after fixing can be ensured even when the soft-segment ratio is increased and the glass transition temperature is reduced.

Further, by introducing the polymer according to the present invention into the toner particles, it is possible to suppress the dielectric loss tangent (tan δ), which is an index of charge leakage property, to a low level.

By keeping tan δ low, it is possible to increase the absolute value of the charge amount. In addition, when the print output speed is increased, a sufficient charge amount of the toner can be obtained. As a result, it can be inferred that contamination inside a machine due to toner scattering, occurrence of image defects, and the like can be suppressed.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A toner for electrostatic charge image development comprising toner particles, wherein the toner particles contain a polymer having a structural unit represented by the general expression (1) and a release agent, General expression (1)

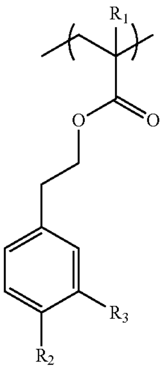

in the general expression (1), $R_1$ represents a hydrogen atom or an alkyl group having 1 to 3 carbon atoms, and $R_2$ and $R_3$ each independently represents a hydrogen atom, an alkyl group having 1 to 3 carbon atoms, or an alkoxy group.

2. The toner for electrostatic charge image development according to claim 1, wherein the release agent is a fatty acid ester using a fatty acid having a range of 16 to 24 carbon atoms.

3. The toner for electrostatic charge image development according to claim 1, wherein $R_1$ in the general expression (1) is a hydrogen atom or a methyl group, and $R_2$ and $R_3$ are each independently a hydrogen atom or a methoxy group.

4. The toner for electrostatic charge image development according to claim 1, wherein $R_2$ and $R_3$ in the general expression (1) are hydrogen atoms.

5. The toner for electrostatic charge image development according to claim 1, wherein the polymer having a structural unit represented by the general expression (1) is a copolymer of a first polymerizable monomer having a structure represented by the following general expression (2) and a second polymerizable monomer copolymerizable with the first polymerizable monomer, General expression (2)

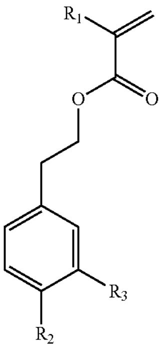

in the general expression (2), $R_1$ represents a hydrogen atom or an alkyl group having 1 to 3 carbon atoms, $R_2$ and $R_3$ each independently represents a hydrogen atom, an alkyl group having 1 to 3 carbon atoms, or an alkoxy group.

6. The toner for electrostatic charge image development according to claim 5, wherein the content of the structural unit derived from the first polymerizable monomer is in the range of 10 to 35% by mass with respect to a total of all structural units (100% by mass) constituting the polymer having the structural unit represented by the general expression (1).

7. The toner for electrostatic charge image development according to claim 5, wherein the second polymerizable monomer is selected from the group consisting of at least styrenes, acrylic acid, methacrylic acid, acrylic acid ester, and methacrylic acid ester.

8. The toner for electrostatic charge image development according to claim 7, wherein the second polymerizable monomer is one or more kinds selected from the group consisting of styrene, acrylic acid, n-butyl acrylate, iso-butyl acrylate, 2-ethylhexyl acrylate, and methacrylic acid.

9. The toner for electrostatic charge image development according to claim 2, wherein the fatty acid ester using a fatty acid having a range of 16 to 24 carbon atoms is behenyl behenate.

10. The toner for electrostatic charge image development according to claim 2, wherein the fatty acid ester using a fatty acid having a range of 16 to 24 carbon atoms is pentaerythritol tetrabehenate.

11. The toner for electrostatic charge image development according to claim 2, wherein the fatty acid ester using a fatty acid having a range of 16 to 24 carbon atoms is ethylene glycol distearate.

12. The toner for electrostatic charge image development according to claim 2, wherein the content of the fatty acid ester using a fatty acid having a range of 16 to 24 carbon atoms in a toner for electrostatic charge image development is in the range of 5 to 20% by mass.

13. A method for manufacturing a toner for electrostatic charge image development according to claim 1, comprising a step of:

polymerizing a first polymerizable monomer having a structure represented by the following general expression (2) to prepare a toner binder particle dispersion liquid containing the release agent, General expression (2)

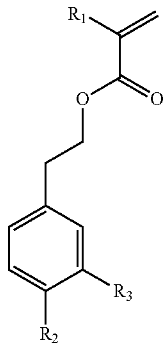

in the general expression (2), $R_1$ represents a hydrogen atom or an alkyl group having 1 to 3 carbon atoms, $R_2$ and $R_3$ each independently represents a hydrogen atom, an alkyl group having 1 to 3 carbon atoms, or an alkoxy group.

14. A method for manufacturing a toner for electrostatic charge image development according to claim 2, comprising a step of:

polymerizing a first polymerizable monomer having a structure represented by the following general expression (2) to prepare a toner binder particle dispersion liquid containing the fatty acid ester using a fatty acid having a range of 16 to 24 carbon atoms as a release agent, General expression (2)

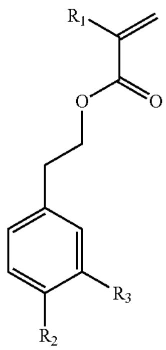

in the general expression (2), $R_1$ represents a hydrogen atom or an alkyl group having 1 to 3 carbon atoms, $R_2$ and $R_3$ each independently represents a hydrogen atom, an alkyl group having 1 to 3 carbon atoms, or an alkoxy group.

15. The method for manufacturing a toner for electrostatic charge image development according to claim 14, wherein the fatty acid ester using a fatty acid having a range of 16 to 24 carbon atoms is behenyl behenate.

16. The method for manufacturing a toner for electrostatic charge image development according to claim 14, wherein the fatty acid ester using a fatty acid having a range of 16 to 24 carbon atoms is pentaerythritol tetrabehenate.

17. The method for manufacturing a toner for electrostatic charge image development according to claim 14, wherein the fatty acid ester using a fatty acid having a range of 16 to 24 carbon atoms is ethylene glycol distearate.

* * * * *